(12) United States Patent
Zhang et al.

(10) Patent No.: US 10,884,611 B2
(45) Date of Patent: Jan. 5, 2021

(54) METHOD AND APPARATUS FOR CONTROLLING TOUCH SCREEN OF TERMINAL, AND TERMINAL

(71) Applicant: GUANGDONG OPPO MOBILE TELECOMMUNICATIONS CORP. LTD., Guangdong (CN)

(72) Inventors: Qiang Zhang, Guangdong (CN); Yixue Ge, Guangdong (CN); Hao Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 15/704,701

(22) Filed: Sep. 14, 2017

(65) Prior Publication Data

US 2018/0173369 A1 Jun. 21, 2018

(30) Foreign Application Priority Data

Dec. 16, 2016 (CN) .......................... 2016 1 1167979

(51) Int. Cl.
*G06F 3/0488* (2013.01)
(52) U.S. Cl.
CPC ...... *G06F 3/04883* (2013.01); *G06F 3/04886* (2013.01); *G06F 2203/04104* (2013.01)
(58) Field of Classification Search
CPC .... G06F 3/041; G06F 3/0418; G06F 3/04883; G06F 3/04886
See application file for complete search history.

(56) References Cited

U.S. PATENT DOCUMENTS

2007/0220444 A1* 9/2007 Sunday ................. G06F 3/0488
715/788
2012/0075212 A1 3/2012 Park
(Continued)

FOREIGN PATENT DOCUMENTS

| CN | 103235695 A | 8/2013 |
| CN | 103902074 A | 7/2014 |

(Continued)

OTHER PUBLICATIONS

English Translation of International Search Report in international application No. PCT/CN2017/095972, dated Oct. 27, 2017.
(Continued)

*Primary Examiner* — Alexander Eisen
*Assistant Examiner* — Cory A Almeida
(74) *Attorney, Agent, or Firm* — Ladas & Parry LLP (57) ABSTRACT

A method and apparatus for controlling a touch screen of a terminal as well as a terminal are provided. The method includes detecting a multi-touch event performed on a terminal touch screen. The method also includes determining an area where multiple touch points corresponding to the multi-touch event are distributed, wherein the terminal touch screen is divided into a wrong-trigger prevention area, a buffer area and a normal touch area, the buffer area being located between the wrong-trigger prevention area and the normal touch area. The method also includes, when the multiple touch points are distributed in the wrong-trigger prevention area and the buffer area, controlling the touch screen to respond to a touch operation at the multiple touch points.

15 Claims, 8 Drawing Sheets

(56) References Cited

U.S. PATENT DOCUMENTS

| | | | | |
|---|---|---|---|---|
| 2012/0260220 | A1* | 10/2012 | Griffin | G06F 3/033 715/863 |
| 2013/0097566 | A1* | 4/2013 | Berglund | G06F 3/04883 715/863 |
| 2014/0176470 | A1* | 6/2014 | Huang | G06F 3/0416 345/173 |
| 2015/0363037 | A1* | 12/2015 | Shih | G06F 3/0416 345/173 |
| 2017/0123590 | A1 | 5/2017 | Han et al. | |

FOREIGN PATENT DOCUMENTS

| | | |
|---|---|---|
| CN | 104238912 A | 12/2014 |
| CN | 104615303 A | 5/2015 |
| CN | 104679429 A | 6/2015 |
| CN | 104731498 A | 6/2015 |
| CN | 150718183 A | 6/2016 |
| CN | 106681554 A | 5/2017 |
| EP | 2434385 A2 | 3/2012 |
| WO | 2015192709 A1 | 12/2015 |

OTHER PUBLICATIONS

English Translation of the Written Opinion of the International Search Authority in international application No. PCT/CN2017/095972, dated Oct. 27, 2017.
Supplementary European Search Report in European application No. 17187083.5, dated Jan. 24, 2018.
Chinese Office Action dated Nov. 23, 2018 for Application No. CN 201611167979.7 with English translation.
First Office Action of the Indian application No. 201714033177, dated Oct. 8, 2020.
Oral Office Action of the European application No. 17187083.5, dated Aug. 26, 2020.

* cited by examiner

METHOD AND APPARATUS FOR CONTROLLING TOUCH SCREEN OF TERMINAL, AND TERMINAL

CROSS-REFERENCE TO RELATED APPLICATIONS

This application is filed based on and claims priority to Chinese Patent Application 201611167979.7 filed on Dec. 16, 2016, the entire contents of which are incorporated herein by reference in its entirety.

TECHNICAL FIELD

The present disclosure relates to the technical field of electronic terminals, and in particular to a method and apparatus for controlling a touch screen of a terminal and to a terminal.

BACKGROUND

At present, a touch screen has become basic equipment for most of mobile terminals. A user of a mobile terminal can easily and quickly execute various operations on the mobile terminal through the touch screen. In order to display more contents on the screen of the mobile terminal and improve the viewing experience of the user, the touch screen is enlarged. In such trend, in order to combine the portability and attractiveness of the mobile terminal, the screen occupation becomes a new index for measuring the performance of the mobile terminal. In pursuit of a higher screen occupation and in order to reduce the influence of a screen bezel on a visual effect, mobile terminal manufacturers rush to adopt a narrow-bezel or no-bezel design to optimize the mobile terminal. Such narrow-bezel or no-bezel mobile terminals become more and more favored by consumers. And those mobile terminals generally are provided with a wrong-trigger prevention function.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to a first aspect of the present disclosure, there is provided a method for controlling a touch screen of a terminal. The method includes detecting a multi-touch event performed on a touch screen of a terminal. The method also includes determining an area where multiple touch points corresponding to the multi-touch event are distributed, wherein the touch screen of the terminal is divided into a wrong-trigger prevention area, a buffer area and a normal touch area, the buffer area being located between the wrong-trigger prevention area and the normal touch area. The method also includes when the multiple touch points are distributed in the wrong-trigger prevention area and the buffer area, controlling the touch screen to respond to a touch operation at the multiple touch points.

According to a second aspect of the present disclosure, there is provided an apparatus for controlling a touch screen of a terminal. The apparatus includes a processor and a memory configured to store instructions executable by the processor. The processor is caused by the instructions to detect a multi-touch event performed on a touch screen of a terminal. The processor is also caused by the instructions to determine an area where multiple touch points corresponding to the multi-touch event are distributed, wherein the touch screen of the terminal being divided into a wrong-trigger prevention area, a buffer area and a normal touch area, the buffer area being located between the wrong-trigger prevention area and the normal touch area. The processor is also caused by the instructions to control the touch screen to respond to a touch operation at the multiple touch points when the multiple touch points are distributed in the wrong-trigger prevention area and the buffer area.

According to a third aspect of the present disclosure, there is provided a terminal. The terminal includes the apparatus for controlling a touch screen, as mentioned above.

According to a fourth aspect of aspects of the present disclosure, a non-transitory computer-readable storage medium is provided. The non-transitory computer-readable storage medium has stored therein instructions that, when executed by a processor of a terminal, cause the terminal to perform a method for controlling a touch screen of the terminal. The method includes detecting a multi-touch event performed on a touch screen of a terminal. The method also includes determining an area where multiple touch points corresponding to the multi-touch event are distributed, wherein the touch screen of the terminal is divided into a wrong-trigger prevention area, a buffer area and a normal touch area, the buffer area being located between the wrong-trigger prevention area and the normal touch area. The method also includes, when the multiple touch points are distributed in the wrong-trigger prevention area and the buffer area, controlling the touch screen to respond to a touch operation at the multiple touch points.

It is to be understood that both the foregoing general description and the following detailed description are exemplary and explanatory only and are not restrictive of the present disclosure, as claimed.

DETAILED DESCRIPTION

Reference will now be made in detail to exemplary aspects of the present disclosure, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims. In addition, it is to be noted that for convenience of description, only parts relevant to the present disclosure, instead of all structures, are shown in the accompanying drawings.

Certain terms used in the present disclosure are only intended to describe specific aspects, but are not intended to limit the present disclosure. For example, singular form words "a," "said," and "the" used in the present disclosure and the appended claims are intended to include plural form, unless otherwise clearly stated. Also, the term "and/or" used herein refers to any or all combinations of one or more listed related items.

It is to be understood that although the aspects of the present disclosure may apply terms including first, second, third and so on to describe various information, these information should not be limited to these terms. These terms are only used for distinguishing information of the same type from each other. For example, first information may be also called second information without departing from the scope of the aspects of the present disclosure, and similarly, second information may be also called first information, which depends on context. For example, the word "if" used here may be interpreted as "at the moment when . . . " or "when . . . " or "in response to confirmation".

It is to be noted that although the flowcharts in some exemplary aspects describe each operation as a sequenced process, a variety of operations therein may be implemented in parallel, concurrently or simultaneously. In addition, the sequence of all operations may be re-arranged. When the operations are completed, the process may be ended, but additional operations not included in the accompanying drawings may be executed. The process may correspond to a method, a function, a regulation, a sub-routine, a sub-program and the like.

Figure 1:
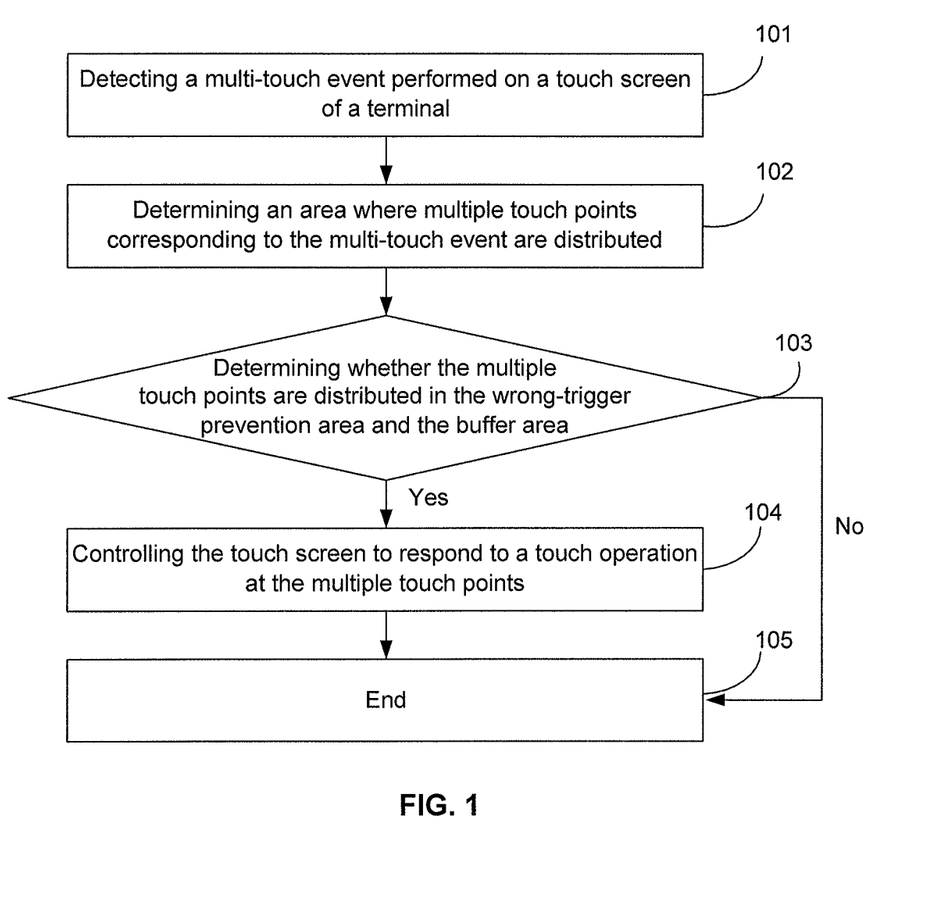
FIG. 1 is a flowchart of a method for controlling a touch screen of a terminal according to an aspect of the present disclosure.

FIG. 1 is a flowchart of a method for controlling a touch screen of a terminal according to an aspect of the present disclosure. The method may be executed by an apparatus for controlling a touch screen of a terminal, wherein the apparatus may be implemented by software and/or hardware, and generally may be integrated in the terminal. As shown in FIG. 1, the method includes the operations as follow. The method may start at block 101.

At block 101, a multi-touch event performed on a touch screen of a terminal is detected.

The terminal in the present aspect includes equipment integrated with a touch screen, such as a mobile phone, a notebook computer and a tablet computer.

The multi-touch event may be an event of generating multiple touch operations at different positions of the touch screen simultaneously. For example, when a user (i.e. a person) holds a mobile terminal in the right hand and clicks the touch screen by using the index finger of the right hand, the palm of the right hand may also touch an edge of the screen, at which moment the multi-touch event on the touch screen will be detected. For another example, when the user holds the mobile terminal in both hands and clicks the touch screen by the index finger of the right hand, the palm or finger of the left hand may also touch the left edge of the screen carelessly, at which moment the multi-touch event on the touch screen will be detected. For another example, when the user slides on the touch screen, multiple touch points generated in the whole sliding process may be detected, the sliding between every two adjacent touch points among the multiple touch points may be regarded as a multi-touch operation due to a short time interval and a short distance, that is, it may be regarded that a multi-touch event is generated from the sliding operation on the touch screen. The multi-touch event includes the multi-touch event generated from the sliding operation.

At block 102, an area where multiple touch points corresponding to the multi-touch event are distributed is determined, wherein the terminal touch screen is divided into a wrong-trigger prevention area, a buffer area and a normal touch area, the buffer area being located between the wrong-trigger prevention area and the normal touch area.

The method provided in this aspect further includes the following operations that a setting area at an edge of the touch screen of the terminal is determined as a wrong-trigger prevention area; an area formed by extending an inner edge of the wrong-trigger prevention area inward for a set number of pixel points is determined as a buffer area; and an area, except the wrong-trigger prevention area and the buffer area, in the touch screen is determined as a normal touch area.

Figure 2:
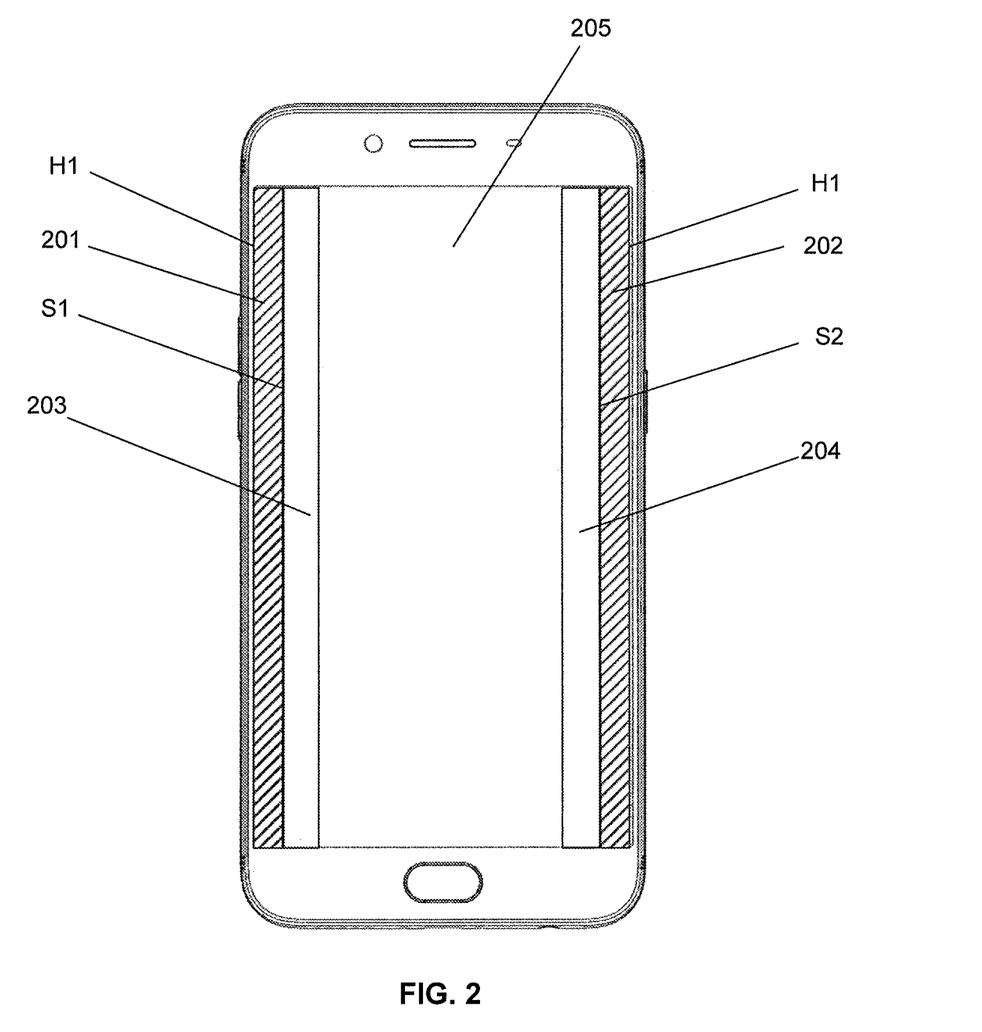
FIG. 2 is a diagram of a touch screen of a terminal according to an aspect of the present disclosure.

FIG. 2 is a diagram of a touch screen of a terminal according to an aspect of the present disclosure. As shown in FIG. 2, a first wrong-trigger prevention area 201 and a second wrong-trigger prevention area 202 are included at left and right edges of the touch screen of the terminal, the first wrong-trigger prevention area 201 and the second wrong-trigger prevention area 202 forming a wrong-trigger prevention area. An inner edge S1 of the first wrong-trigger prevention area 201 is extended inward for a first set number of pixel points to form a first buffer area 203, an inner edge S2 of the second wrong-trigger prevention area 202 is extended inward for a second set number of pixel points to form a second buffer area 204, the first buffer area 203 and the second buffer area 204 form a buffer area, and an area, except the wrong-trigger prevention area and the buffer area, in the touch screen is determined as a normal touch area 205. The first set number of pixel points and the second set number of pixel points may be identical or different in number. The size of the buffer area may be identical to or different from the size of the wrong-trigger prevention area. The width of the wrong-trigger prevention area may be 10 pixels.

It may be understood that the wrong-trigger prevention area may be of other shapes or sizes. FIG. 2 only serves as a schematic description. The wrong-trigger prevention area in FIG. 2 is rectangular, and is as long as a display area of the touch screen. The wrong-trigger prevention area may be of a semi-elliptical shape or other irregular shapes, and the size may be set according to an actual situation. For example, the sizes and shapes of the first wrong-trigger prevention area and the second wrong-trigger prevention area may be set according to a user habit of holding a terminal; if a user prefers to hold the terminal in the right hand, the second wrong-trigger prevention area may be set to be larger. The holding habit of the user may be acquired according to historical data about the holding behavior of the user.

In addition, the specific position and size of the wrong-trigger prevention area may be adjusted. For example, the wrong-trigger prevention area may be located at the lower left and/or lower right of the edge of the touch screen or located at the upper left and/or upper right of the edge of the touch screen. Correspondingly, the shape and size of the buffer area may be determined according to the wrong-trigger prevention area.

A setting option for wrong-trigger prevention may be added to the terminal. The wrong-trigger prevention function may be automatically started by system according to actual situations or by a user according to personal needs. In the present aspect, it is supposed that the wrong-trigger prevention function has been started.

At block 103, it is determined whether the multiple touch points are distributed in the wrong-trigger prevention area and the buffer area, if so, the operation at block 104 is executed, and otherwise, the flow is ended.

When the wrong-trigger prevention function has been started, the terminal may perform wrong-trigger prevention through the following rule: when the multi-touch event is detected, a touch point in the normal touch area is responded while a touch point in the wrong-trigger prevention area is omitted.

In a case that the touch screen is divided into the wrong-trigger prevention area and the normal touch area, when the wrong-trigger prevention function is in a started state, if the multiple touch points corresponding to the multi-touch event are distributed in the wrong-trigger prevention area and the normal touch area respectively, the touch point in the normal touch area, instead of the touch point in the wrong-trigger prevention area, will be responded so as to achieve the wrong-trigger prevention function. If all of the multiple touch points are distributed in the wrong-trigger prevention area or the normal touch area, the multiple touch points will be normally responded. However, if a current operation is a sliding operation from the wrong-trigger prevention area to the normal touch area or from the normal touch area to the wrong-trigger prevention area, two adjacent touch points, located in the wrong-trigger prevention area and the normal touch area respectively and at an intersection boundary of the wrong-trigger prevention area and the normal touch area, among multiple touch points generated in a sliding operation are multi-touch, and the touch point in the wrong-trigger prevention area will not be responded, so that the sliding operation is disconnected.

Figure 3:
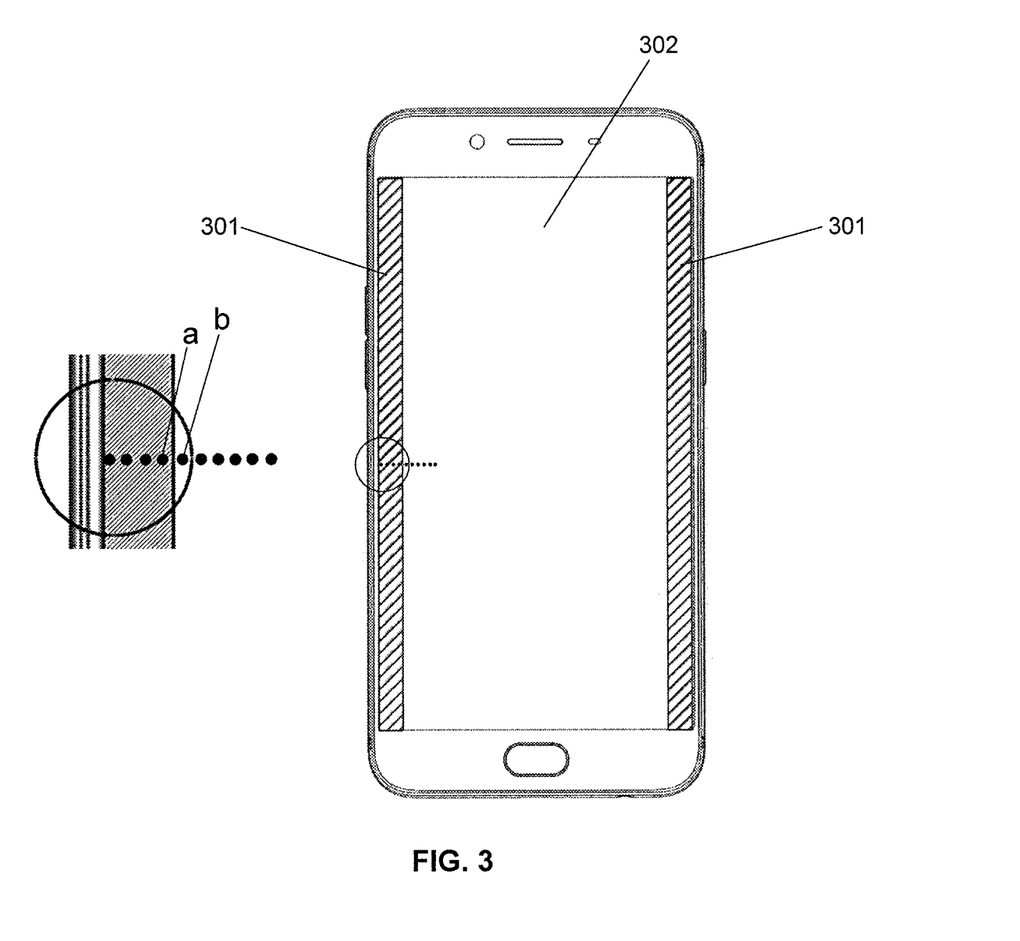
FIG. 3 is a diagram of another touch screen of a terminal according to an aspect of the present disclosure.

FIG. 3 is a diagram of another touch screen of a terminal according to an aspect of the present disclosure. As shown in FIG. 3, a touch screen 300 is divided into a wrong-trigger prevention area 301 and a normal touch area 302. A sliding operation performed on a touch screen is detected, and the sliding operation corresponds to multiple touch points as shown in FIG. 3, wherein a touch point a and a touch point b are two adjacent touch points, the touch point a is located in the wrong-trigger prevention area, while the touch point b is located in the normal touch area, so on the basis of the wrong-trigger prevention rule above, the touch operation at the touch point b instead of the touch operation at the touch point a will be responded, which will cause disconnection of a complete sliding operation at the touch point a, resulting that the terminal would identify the complete sliding operation as two sliding operations. When a user turns to a previous page or a next page through a sliding operation performed on the wrong-trigger prevention area and the normal touch area, the terminal will turn to previous two pages or next two pages as a response, thus affecting the response accuracy of the touch screen of the terminal, and reducing the accuracy of wrong-trigger prevention of the touch screen of the terminal. It may be understood that the sliding operation not only is limited to page turning, but also can achieve other functions.

At block 104, the touch screen is controlled to respond to a touch operation at the multiple touch points.

In this aspect, the touch screen is divided into a wrong-trigger prevention area, a buffer area and a normal touch area. When it is determined that multiple touch points in a multi-touch event are distributed in the wrong-trigger prevention area and the buffer area respectively, the touch screen is controlled to respond to a touch operation at the multiple touch points. A sliding operation across the wrong-trigger prevention area and the normal touch area is prevented from being disconnected.

Figure 4:
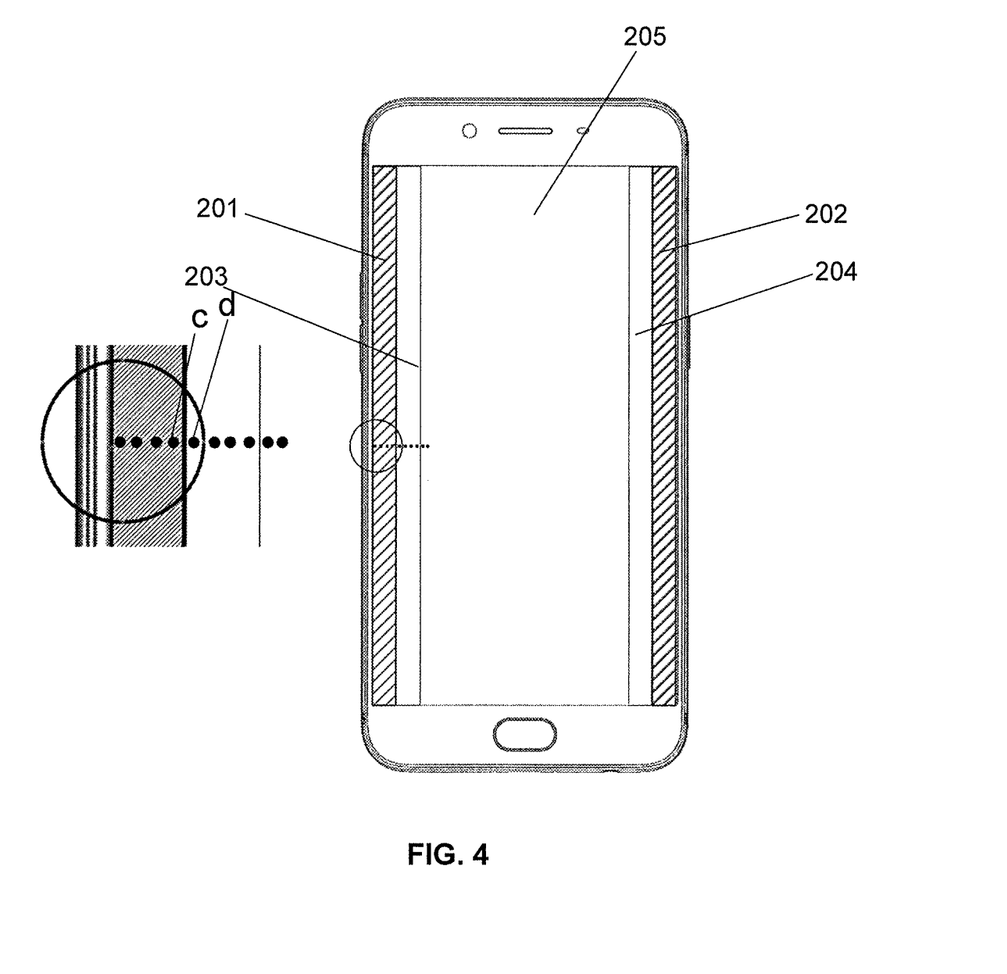
FIG. 4 is a diagram of another touch screen of a terminal according to an aspect of the present disclosure.

FIG. 4 is a diagram of another touch screen of a terminal according to an aspect of the present disclosure. As shown in FIG. 4, a sliding operation performed on a touch screen is detected, and the sliding operation corresponds to multiple touch points as shown in FIG. 4, wherein a touch point c and a touch point d are two adjacent touch points, the touch point c being located in a wrong-trigger prevention area, and the touch point d being located in a buffer area, the touch screen of a terminal will respond to touch operations at the touch point c and the touch point d, thus preventing the whole sliding operation from being disconnected.

At block 105, the process is ended.

According to the method provided in this aspect, when a multi-touch event performed on a touch screen of a terminal is detected, an area where multiple touch points corresponding to the multi-touch event are distributed is determined. When the multiple touch points are distributed in a wrong-trigger prevention area and a buffer area, the touch screen is controlled to respond to a touch operation at the multiple touch points. Whilst wrong-trigger prevention is carried out on a touch operation performed on the touch screen of the terminal on the basis of existence of the wrong-trigger prevention area, a sliding operation, performed on the touch screen of the terminal, across the wrong-trigger prevention area and a normal touch area is prevented from being disconnected, and the accuracy of wrong-trigger prevention of the terminal is improved.

On the basis of the above-mentioned technical solution, determining a setting area at an edge of the touch screen of the terminal as a wrong-trigger prevention area may include: when the terminal is in a portrait state, determining a first set area at a length edge of the touch screen of the terminal as the wrong-trigger prevention area; and when the terminal is in a landscape state, determining a second set area at a width edge of the touch screen of the terminal as the wrong-trigger prevention area.

As shown in FIG. 2, when the terminal is in the portrait state, a first wrong-trigger prevention area 201 and a second wrong-trigger prevention area 202 at a length edge H1 of the touch screen of the terminal are determined as the wrong-trigger prevention area.

Figure 5:
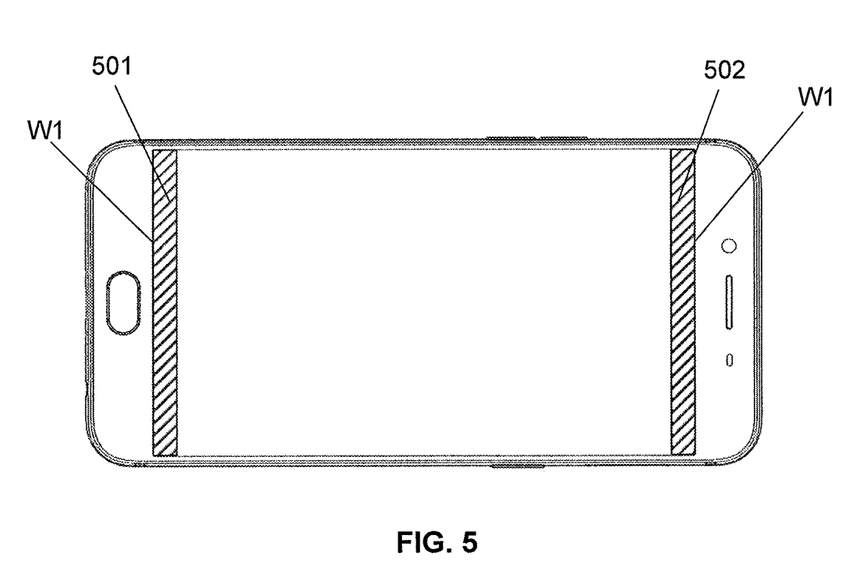
FIG. 5 is a diagram of another touch screen of a terminal according to an aspect of the present disclosure.

FIG. 5 is a diagram of another touch screen of a terminal according to an aspect of the present disclosure. As shown in FIG. 5, when the terminal is in the landscape state, a third wrong-trigger prevention area 501 and a fourth wrong-trigger prevention area 502 at a width edge W1 of the touch screen of the terminal are determined as the wrong-trigger prevention area.

Figure 6:
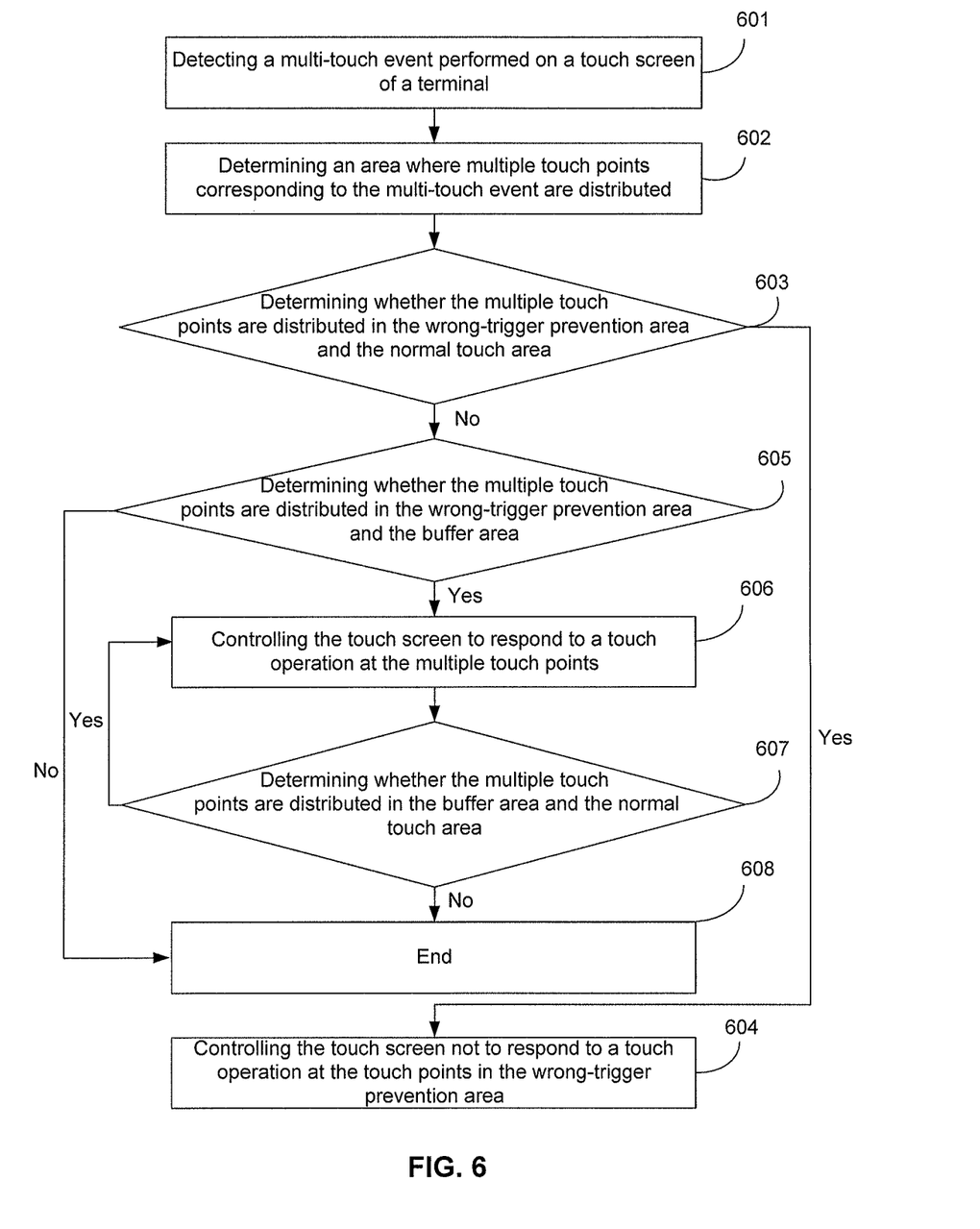
FIG. 6 is a flowchart of another method for controlling a touch screen of a terminal according to an aspect of the present disclosure.

FIG. 6 is a flowchart of another method for controlling a touch screen of a terminal according to an aspect of the present disclosure. The present aspect is optimized based on the above-mentioned aspect. The details not described in the present aspect may refer to the above-mentioned aspect. As shown in FIG. 6, the method provided in the present aspect includes the operations as follows.

At block 601, a multi-touch event performed on a touch screen of a terminal is detected.

At block 602, an area where multiple touch points corresponding to the multi-touch event are distributed is determined, wherein the terminal touch screen is divided into a wrong-trigger prevention area, a buffer area and a normal touch area, the buffer area being located between the wrong-trigger prevention area and the normal touch area.

At block 603, it is determined whether the multiple touch points are distributed in the wrong-trigger prevention area and the normal touch area, if so, the operation at block 604 is executed, and otherwise, the operation at block 605 is executed.

At block 604, the touch screen is controlled not to respond to a touch operation at the touch points in the wrong-trigger prevention area.

When the multiple touch points are distributed in the wrong-trigger prevention area and the normal touch area respectively, the touch screen is controlled not to respond to a touch operation at the touch points in the wrong-trigger prevention area, and is controlled to respond to a touch operation at the touch points in the normal touch area so as to achieve wrong-trigger prevention.

At block 605, it is determined whether the multiple touch points are distributed in the wrong-trigger prevention area and the buffer area, if so, the operation at block 606 is executed, and otherwise, the flow is ended.

At block 606, the touch screen is controlled to respond to a touch operation at the multiple touch points.

By controlling to respond to the touch operation at two touch points distributed in the wrong-trigger prevention area and the buffer area in a sliding event, the sliding operation may be prevented from being disconnected.

At block 607, it is determined whether the multiple touch points are distributed in the buffer area and the normal touch area, if so, the operation at block 606 is executed, and otherwise, the flow is ended.

At block 608, the process is ended.

The end may refer to the ending of the whole flow or execution of other operations not shown in the figure.

According to the method provided in the aspect of the present disclosure, a buffer area is arranged between a wrong-trigger prevention area and a normal touch area. When multi-touch events performed on the wrong-trigger prevention area and the normal touch area are detected, touch points in the wrong-trigger prevention area are omitted, thus preventing a wrong trigger on a touch screen. When a sliding operation of the touch screen is detected, touch points respectively distributed in the wrong-trigger prevention area and the buffer area are responded, thus preventing the sliding operation from being disconnected, and improving the accuracy of wrong-trigger prevention of a terminal.

Figure 7:
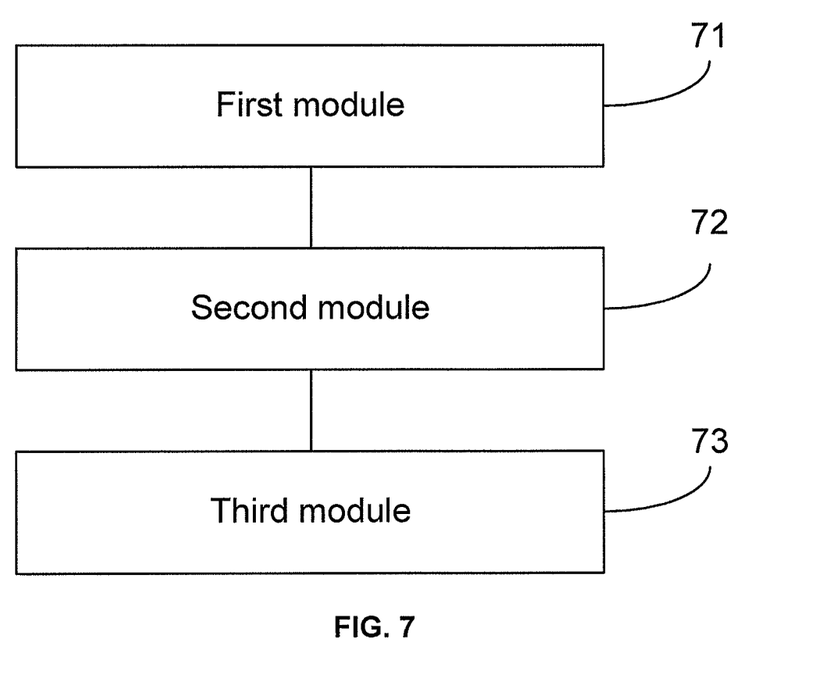
FIG. 7 is a structural diagram of a apparatus for controlling a touch screen of a terminal according to an aspect of the present disclosure.

FIG. 7 is a structural diagram of an apparatus for controlling a touch screen of a terminal according to an aspect of the present disclosure. As shown in FIG. 7, the apparatus provided in the present aspect includes a first module 71, a second module 72 and a third module 73.

The first module 71 is configured to detect a multi-touch event performed on a touch screen of a terminal.

The second module 72 is configured to determine an area where multiple touch points corresponding to the multi-touch event are distributed, wherein the touch screen of the terminal is divided into a wrong-trigger prevention area, a buffer area and a normal touch area, the buffer area being located between the wrong-trigger prevention area and the normal touch area.

The third module 73 is configured to control, when the multiple touch points are distributed in the wrong-trigger prevention area and the buffer area, the touch screen to respond to a touch operation at the multiple touch points.

By means of the apparatus for controlling a touch screen of a terminal provided in the present aspect, when a multi-touch event performed on a touch screen of a terminal is detected, an area where multiple touch points corresponding to the multi-touch event are distributed is determined, and in a case that the multiple touch points are distributed in a wrong-trigger prevention area and a buffer area, the touch screen is controlled to respond to a touch operation at the multiple touch points. Whilst wrong-trigger prevention is carried out on a touch operation performed on the touch screen of the terminal on the basis of the wrong-trigger prevention area, a sliding operation, performed on the touch screen of the terminal, across the wrong-trigger prevention area and a normal touch area is prevented from being disconnected, and the accuracy of wrong-trigger prevention of the terminal is improved.

On the basis of the above-mentioned aspect, the apparatus may further include a fourth module configured to control, if the multiple touch points are distributed in the buffer area and the normal touch area, the touch screen to respond to the touch operation at the multiple touch points.

On the basis of the above-mentioned aspect, the apparatus may further include a fifth module configured to control, if the multiple touch points are distributed in the wrong-trigger prevention area and the normal touch area, the touch screen not to respond to the touch operation at the touch points in the wrong-trigger prevention area.

On the basis of the above-mentioned aspect, the multi-touch event may include a multi-touch event generated in a sliding operation.

On the basis of the above-mentioned aspect, the apparatus may further include a sixth module configured to determine a setting area at an edge of the touch screen of the terminal as the wrong-trigger prevention area.

On the basis of the above-mentioned aspect, the apparatus may further include a seventh module configured to determine an area formed by extending an inner edge of the wrong-trigger prevention area inward for a set number of pixel points as the buffer area.

On the basis of the above-mentioned aspect, the apparatus may further include a eighth module configured to determine an area, except the wrong-trigger prevention area and the buffer area, in the touch screen as the normal touch area.

On the basis of the above-mentioned aspect, the sixth module may be configured to determine, when the terminal is in a portrait state, a first set area at a length edge of the touch screen of the terminal as the wrong-trigger prevention area. The sixth module may be further configured to determine, when the terminal is in a landscape state, a second set area at a width edge of the touch screen of the terminal as the wrong-trigger prevention area.

Accordingly, the present disclosure further provides an apparatus. The apparatus includes a processor, and a memory storing instructions that, when executed by the processor, cause the processor to: detect a multi-touch event performed on a touch screen of a terminal; determine an area where multiple touch points corresponding to the multi-touch event are distributed, wherein the touch screen of the terminal is divided into a wrong-trigger prevention area, a buffer area and a normal touch area, the buffer area being located between the wrong-trigger prevention area and the normal touch area; and control, when the multiple touch points are distributed in the wrong-trigger prevention area and the buffer area, the touch screen to respond to a touch operation at the multiple touch points.

Figure 8:
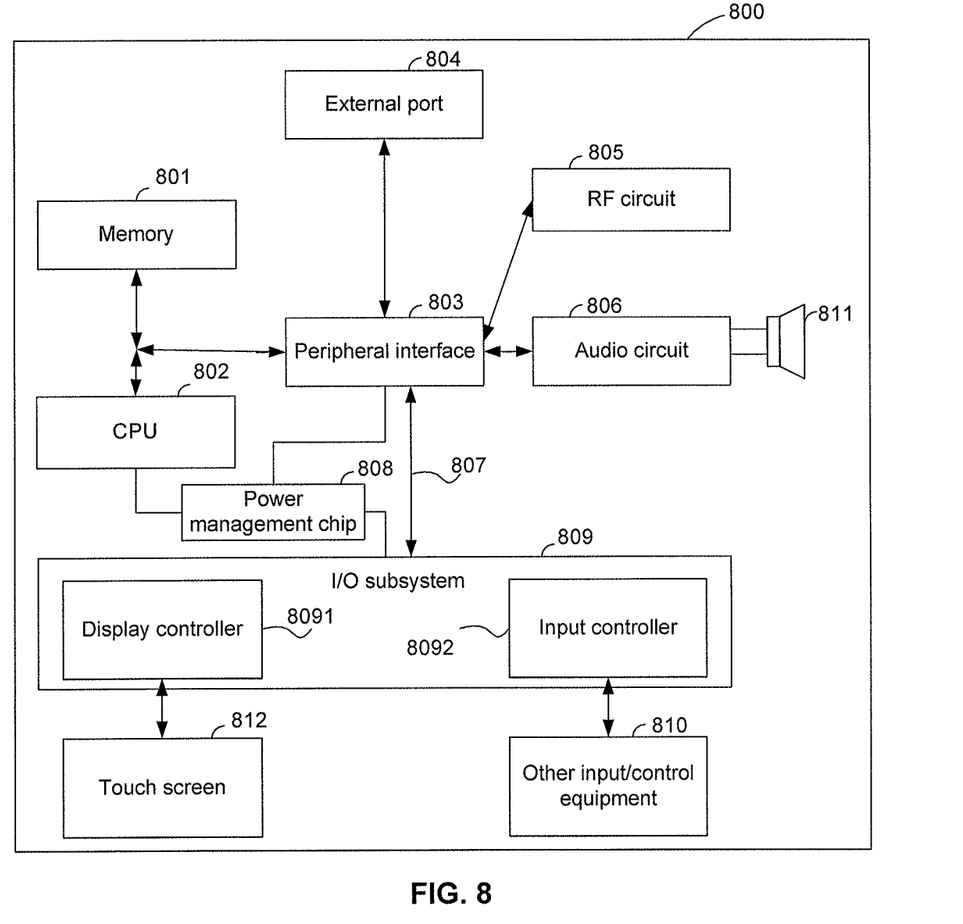
FIG. 8 is a structural diagram of a terminal according to an aspect of the present disclosure.

An aspect of the present disclosure provides a terminal. The apparatus for controlling a touch screen of the terminal, as provided in the above aspect of the present disclosure, may be integrated into the terminal. FIG. 8 is a structural diagram of a terminal according to an aspect of the present disclosure. As shown in FIG. 8, the terminal may include: a housing (not shown in the figure), a memory 801, a Central Processing Unit (CPU) 802 (also referred to as a processor, CPU for short hereinafter), a circuit board (not shown in the figure) and a power circuit (not shown in the figure). The circuit board is disposed inside a space encircled by the housing; the CPU 802 and the memory 801 are arranged on the circuit board; the power circuit is used for supplying power to each circuit or components of the terminal; the memory 801 is used for storing executable program codes; the CPU 802 runs a program corresponding to the executable program codes by reading the executable program codes stored in the memory 801 so as to execute the following operations of: detecting a multi-touch event performed on a touch screen of a terminal; determining an area where multiple touch points corresponding to the multi-touch event are distributed, wherein the touch screen of the terminal is divided into a wrong-trigger prevention area, a buffer area and a normal touch area, the buffer area being located between the wrong-trigger prevention area and the normal touch area; and controlling, when the multiple touch points are distributed in the wrong-trigger prevention area and the buffer area, the touch screen to respond to a touch operation at the multiple touch points.

The terminal further includes: a peripheral interface 803, a Radio Frequency (RF) circuit 805, an audio circuit 806, a loudspeaker 811, a power management chip 808, an Input/Output (I/O) subsystem 809, a touch screen 812, other input/control equipment 810 and an external port 804, all of which communicate through one or more communication buses or signal lines 807.

It should be appreciated that the terminal 800 shown in the figure is only an example of terminals, and the terminal 800 may have components more or less than those shown in the figure. The terminal may have a combination of two or more components, or may have different configurations of components. Various components shown in the figure may be implemented in a combination of hardware and software, or software, or hardware including one or more signal processing and/or dedicated integrated circuits.

A terminal for controlling a touch screen provided in the present aspect will be described in detail below by taking a mobile phone as an example. The mobile phone may include a memory 801, a CPU 802, a peripheral interface 803, an RF circuit 805, an audio circuit 806, a power management chip 808, an I/O subsystem 809, a loudspeaker 811, and a touch screen 812.

The memory 801 may be accessed by the CPU 802, the peripheral interface 803 and the like. The memory 801 may include a high-speed random access memory or may include a nonvolatile memory such as one or more disk storage, a flash or other volatile solid storage.

The peripheral interface 803 may connect input and output peripherals of the terminal to the CPU 802 and the memory 801.

The I/O subsystem 809 may connect the input and output peripherals of the terminal, such as a touch screen 812 and other input/control equipment 810, to the peripheral interface 803. The I/O subsystem 809 may include a display controller 8091 and one or more input controllers 8092 for controlling other input/control equipment 810. The one or more input controllers 8092 is for receiving an electric signal from other input/control equipment 810 or send an electric signal to other input/control equipment 810, and said other input/control equipment 810 may include a physical button (a press button, a rocker button, etc.), a dial, a sliding switch, an operating rod and a clicking roller. It is to be noted that the input controller 8092 may be connected to any one of the following: a keyboard, an infrared port, a USB interface and an indicating device such as a mouse.

The touch screen 812 is an input interface and an output interface between a user equipment and a user, and is for displaying a visual output to the user, wherein the visual output may include a graph, a text, an icon, a video and the like.

The display controller 8091 in the I/O subsystem 809 is for receiving an electric signal from the touch screen 812 or sends an electric signal to the touch screen 812. The touch screen 812 is for detecting a contact on the touch screen, the display controller 8091 is for converting the detected contact into an interaction with a user interface object displayed on the touch screen 812, i.e., realizing a human-machine interaction. The user interface object displayed on the touch screen 812 may be an icon for running a game, an icon of connection to a network, and the like. It is to be noted that the terminal may further include an optical mouse, the optical mouse being a touch-sensitive surface that does not display the visual output or being an extension of a touch-sensitive surface formed by the touch screen.

The RF circuit 805 is mainly for establishing communications between a mobile phone and a wireless network (i.e., network side) to realize data receiving and sending between the mobile phone and the wireless network such as receiving and sending of a short message, an E-mail and the like. Specifically, the RF circuit 805 receives and sends an RF signal that is also referred to as an electromagnetic signal, and the RF circuit 805 converts an electric signal into an electromagnetic signal or converts an electromagnetic signal into an electric signal, and communicates with a communication network and other equipment through the electromagnetic signal. The RF circuit 805 may include a known circuit for executing these functions, which includes but is not limited to an antenna system, an RF transceiver, one or more amplifiers, a tuner, one or more oscillators, a digital signal processor, a Coder-Decoder (CODEC) chip group, a Subscriber Identity Module (SIM) and the like.

The audio circuit 806 is mainly for receiving audio data from the peripheral interface 803, converting the audio data into an electric signal, and sending the electric signal to a loudspeaker 811.

The loudspeaker 811 is for restoring a voice signal that is received, by the mobile phone, from the wireless network through the RF circuit 805 into sound, and playing the sound to the user.

The power management chip 808 is for performing power supply and power management on hardware connected to the CPU 802, the I/O subsystem and the peripheral interface 803.

The terminal and the apparatus for controlling a touch screen of a terminal, as provided in the above-mentioned aspects, may execute the method for controlling a touch screen of a terminal provided in any aspect of the present disclosure, and have corresponding functional modules for executing the method and getting beneficial effects. Technical details not described in the above-mentioned aspects may refer to the method for controlling a touch screen of a terminal provided in any aspect of the present disclosure.

Other aspects of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope the present disclosure being indicated by the following claims.

It will be appreciated that the above aspects of the present disclosure are not limited to the exact construction that has been described above and illustrated in the accompanying drawings, and that various modifications and changes can be made without departing from the scope thereof. It is intended that the scope of the aspects of the present disclosure only be limited by the appended claims.

What is claimed is:

1. A method for controlling a touch screen of a terminal, comprising:
   detecting a multi-touch event performed on a touch screen of a terminal, the multi-touch event being an event of generating multiple touch operations at different positions of the touch screen simultaneously, wherein the touch screen of the terminal is configured for displaying information;
   determining an area where multiple touch points corresponding to the multi-touch event are distributed, wherein the touch screen of the terminal, which is configured for displaying information, is divided into a wrong-trigger prevention area in which information can be displayed, a buffer area and a normal touch area, the buffer area being located between the wrong-trigger prevention area in which information can be displayed and the normal touch area, and the buffer area being an area formed by extending an inner edge of the wrong-trigger prevention area inward for a set number of pixel points;
   controlling, when all of the multiple touch points are distributed in the wrong-trigger prevention area in which information can be displayed, the touch screen to respond to a touch operation at the multiple touch points;
   controlling, when the multiple touch points are distributed in the wrong-trigger prevention area and the buffer area, the touch screen to always respond to a touch operation at the multiple touch points; and
   controlling, when the multiple touch points are simultaneously distributed in the wrong-trigger prevention area and the normal touch area, the touch screen not to respond to a touch operation at touch points in the wrong-trigger prevention area, and to respond to a touch operation at the touch points in the normal touch area so as to achieve wrong-trigger prevention.

2. The method according to claim 1, further comprising:
   controlling, when the multiple touch points are distributed in the buffer area and the normal touch area, the touch screen to respond to a touch operation at the multiple touch points.

3. The method according to claim 2, wherein the multi-touch event comprises a multi-touch event generated in a sliding operation.

4. The method according to claim 2, further comprising:
   determining a setting area at an edge of the touch screen of the terminal as the wrong-trigger prevention area; and
   determining an area, except the wrong-trigger prevention area and the buffer area, in the touch screen as the normal touch area.

5. The method according to claim 4, wherein the determining a setting area at an edge of the touch screen of the terminal as the wrong-trigger prevention area comprises:
   determining, when the terminal is in a portrait state, a first set area at a length edge of the touch screen of the terminal as the wrong-trigger prevention area; and
   determining, when the terminal is in a landscape state, a second set area at a width edge of the touch screen of the terminal as the wrong-trigger prevention area.

6. The method according to claim 1, wherein the multi-touch event comprises a multi-touch event generated in a sliding operation.

7. The method according to claim 1, further comprising:
   determining a setting area at an edge of the touch screen of the terminal as the wrong-trigger prevention area; and
   determining an area, except the wrong-trigger prevention area and the buffer area, in the touch screen as the normal touch area.

8. The method according to claim 7, wherein the determining a setting area at an edge of the touch screen of the terminal as the wrong-trigger prevention area comprises:
   determining, when the terminal is in a portrait state, a first set area at a length edge of the touch screen of the terminal as the wrong-trigger prevention area; and
   determining, when the terminal is in a landscape state, a second set area at a width edge of the touch screen of the terminal as the wrong-trigger prevention area.

9. A non-transitory computer-readable storage medium having stored therein instructions that, when executed by a processor of a terminal, cause the terminal to perform a method for controlling a touch screen of the terminal according to claim 1.

10. An apparatus for controlling a touch screen of a terminal, comprising:
    a processor; and
    a memory storing instructions that, when executed by the processor, cause the processor to:
    detect a multi-touch event performed on a touch screen of a terminal, the multi-touch event being an event of generating multiple touch operations at different positions of the touch screen simultaneously, wherein the touch screen of the terminal is configured for displaying information;
    determine an area where multiple touch points corresponding to the multi-touch event are distributed, wherein the touch screen of the terminal, which is configured for displaying information, is divided into a wrong-trigger prevention area in which information can be displayed, a buffer area and a normal touch area, the buffer area being located between the wrong-trigger prevention area in which information can be displayed and the normal touch area, and the buffer area being an area formed by extending an inner edge of the wrong-trigger prevention area inward for a set number of pixel points;
    control, when all of the multiple touch points are distributed in the wrong-trigger prevention area in which information can be displayed, the touch screen to respond to a touch operation at the multiple touch points;
    control, when the multiple touch points are distributed in the wrong-trigger prevention area and the buffer area, the touch screen to always respond to a touch operation at the multiple touch points; and
    control, when the multiple touch points are simultaneously distributed in the wrong-trigger prevention area and the normal touch area, the touch screen not to respond to a touch operation at the touch points in the wrong-trigger prevention area, and to respond to a touch operation at the touch points in the normal touch area so as to achieve wrong-trigger prevention.

11. The apparatus according to claim 10, wherein the processor is further caused by the instructions to:
control, when the multiple touch points are distributed in the buffer area and the normal touch area, the touch screen to respond to a touch operation at the multiple touch points.

12. The apparatus according to claim 10, wherein the multi-touch event comprises a multi-touch event generated in a sliding operation.

13. The apparatus according to claim 10, wherein the processor is further caused by the instructions to:
determine a setting area at an edge of the touch screen of the terminal as the wrong-trigger prevention area; and
determine an area, except the wrong-trigger prevention area and the buffer area, in the touch screen as the normal touch area.

14. The apparatus according to claim 13, wherein the processor is further caused by the instructions to:
determine, when the terminal is in a portrait state, a first set area at a length edge of the touch screen of the terminal as the wrong-trigger prevention area; and
determine, when the terminal is in a landscape state, a second set area at a width edge of the touch screen of the terminal as the wrong-trigger prevention area.

15. A terminal comprising an apparatus for controlling a touch screen, wherein the apparatus comprises:
a processor; and
a memory storing instructions that, when executed by the processor, cause the processor to:
detect a multi-touch event performed on a touch screen of a terminal, the multi-touch event being an event of generating multiple touch operations at different positions of the touch screen simultaneously, wherein the touch screen of the terminal is configured for displaying information;
determine an area where multiple touch points corresponding to the multi-touch event are distributed, wherein the touch screen of the terminal, which is configured for displaying information, is divided into a wrong-trigger prevention area in which information can be displayed, a buffer area and a normal touch area, the buffer area being located between the wrong-trigger prevention area in which information can be displayed and the normal touch area, and the buffer area being an area formed by extending an inner edge of the wrong-trigger prevention area inward for a set number of pixel points;
control, when all of the multiple touch points are distributed in the wrong-trigger prevention area in which information can be displayed, the touch screen to respond to a touch operation at the multiple touch points;
control, when the multiple touch points are distributed in the wrong-trigger prevention area and the buffer area, the touch screen to always respond to a touch operation at the multiple touch points; and
control, when the multiple touch points are simultaneously distributed in the wrong-trigger prevention area and the normal touch area, the touch screen not to respond to a touch operation at the touch points in the wrong-trigger prevention area, and to respond to a touch operation at the touch points in the normal touch area so as to achieve wrong-trigger prevention.

* * * * *

UNITED STATES PATENT AND TRADEMARK OFFICE
CERTIFICATE OF CORRECTION

Page 1 of 1

PATENT NO. : 10,884,611 B2
APPLICATION NO. : 15/704701
DATED : January 5, 2021
INVENTOR(S) : Qiang Zhang et al.

It is certified that error appears in the above-identified patent and that said Letters Patent is hereby corrected as shown below:

On the Title Page (71) Applicant reads:
"Guangdong (CN)"
Should read:
--Dongguan, Guangdong (CN)--

(73) Assignee reads:
"Guangdong (CN)"
Should read:
--Dongguan, Guangdong (CN)--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*